United States Patent
Muthukrishnan et al.

(10) Patent No.: US 12,309,290 B1
(45) Date of Patent: May 20, 2025

(54) SOFTWARE AS A SERVICE TWO-WAY COMPLIANCE

(71) Applicant: Amazon Technologies, Inc., Seattle, WA (US)

(72) Inventors: Arvind Muthukrishnan, Woodinville, WA (US); Tanvi Jain, New York, NY (US); Paul Willbond Cushman, Montclair, NJ (US); Thomas Michael Leavy, River Edge, NJ (US); ShinYi Chen, Fremont, CA (US)

(73) Assignee: Amazon Technologies, Inc., Seattle, WA (US)

(*) Notice: Subject to any disclaimer, the term of this patent is extended or adjusted under 35 U.S.C. 154(b) by 121 days.

(21) Appl. No.: 18/081,595

(22) Filed: Dec. 14, 2022

(51) Int. Cl.
*H04L 9/32* (2006.01)
*H04L 9/08* (2006.01)
*H04L 9/14* (2006.01)

(52) U.S. Cl.
CPC .......... *H04L 9/3252* (2013.01); *H04L 9/0825* (2013.01); *H04L 9/14* (2013.01)

(58) Field of Classification Search
CPC ........ H04L 9/3252; H04L 9/0825; H04L 9/14
See application file for complete search history.

(56) References Cited

U.S. PATENT DOCUMENTS

| | | | | |
|---|---|---|---|---|
| 10,412,191 B1 * | 9/2019 | Brandwine | ........... | G06F 9/5077 |
| 10,541,814 B2 | 1/2020 | Leavy et al. | | |
| 10,958,689 B1 * | 3/2021 | Ganesan | ................ | G06N 20/00 |
| 11,194,764 B1 * | 12/2021 | Adhikari | ............... | G06F 16/164 |
| 2009/0106557 A1 * | 4/2009 | Leonard | .................. | H04L 63/12 |
| | | | | 713/176 |
| 2017/0161505 A1 * | 6/2017 | Campagna | ............ | G06F 21/602 |
| 2018/0183580 A1 * | 6/2018 | Scarlata | .................. | G06F 21/53 |
| 2018/0332042 A1 | 11/2018 | Yu et al. | | |
| 2021/0266309 A1 * | 8/2021 | Guccione | ............ | H04L 63/0815 |
| 2022/0206867 A1 * | 6/2022 | Parthasarathy | ....... | G06F 9/5072 |
| 2022/0303256 A1 * | 9/2022 | Sheth | .................... | G06F 21/602 |
| 2023/0015819 A1 * | 1/2023 | Nickels | ................. | H04L 9/3271 |
| 2023/0155839 A1 * | 5/2023 | Kreder, III | ............ | H04L 9/3297 |
| | | | | 713/168 |

OTHER PUBLICATIONS

USPTO Office Action dated Nov. 21, 2024, U.S. Appl. No. 17/994,232, 23 pages.

* cited by examiner

*Primary Examiner* — J. Brant Murphy
(74) *Attorney, Agent, or Firm* — Davis Wright Tremaine LLP (57) ABSTRACT

Techniques and a system for a two-way compliance service that enables users to retain information in accordance with a data policy. The system turns on compliance on and notifies clients within a network of a compliance configuration. The system causes a user device to upload an attestation that is signed by a key associated with the user. Once the user device uploads the attestation, key requests for the user return keys for both the user and a compliance bot as part of the attestation, which a sender validates with a public key. The attestation provides that messages being sent to the user need to be copied to the compliance bot.

20 Claims, 8 Drawing Sheets

SOFTWARE AS A SERVICE TWO-WAY COMPLIANCE

BACKGROUND

Business customers rely on communications between employees and business partners to conduct work. As the workforce becomes more distributed, more conversations are happening digitally. As the many options for communication continue to develop, customers more and more are using tools that were designed for consumers, such as text messaging, to conduct business-related discussions between employees within an organizational network and business partners located outside of the network. These tools, however, present the risk of cyber-attack and create new data security challenges for organizations. In addition, when a sender is outside of a network, the sender may not know of a policy of the target network or how to comply with the policy without being in violation of a service provider contract. For example, organizations in the public sector and highly regulated industries (e.g., healthcare, banking, and financial services) need to comply with industry-specific data protection regulations, but existing techniques for ensuring that communications between different networks are in comply with regulatory and auditing policies can be labor intensive and inefficient.

BRIEF DESCRIPTION OF THE DRAWINGS

Various techniques will be described with reference to the drawings, in which.

DETAILED DESCRIPTION

Techniques and system described below relate to enabling customers to retain information to meet regulatory and auditory needs in an encrypted way in their own control storage. Techniques described herein enable that all sides of a conversation are recorded for regulatory and audit purposes and compliance needs for every organization. The techniques described herein also enable compliance for customers, having an expectation that messages sent or received in their user communications will be recorded, in particularly when data being transferred from outside of the network is of high importance to the host organization. Messages recorded in the conversation may be stored in a storage service of a computing system service provider or a default option to capture and save messages and files locally.

In one example, a system including a compliance service and a back-end server provides a compliance configuration to a first user of the compliance service. The system may then receive a cryptographically signed attestation that is signed with a cryptographic key from the first user. The cryptographically signed attestation includes information of the compliance configuration. In response to a request for a list of cryptographic keys, from a second user, the system may provide a cryptographic key associated with the first user and additional information in accordance with the compliance configuration. The additional compliance information may include at least the cryptographically signed attestation and an identifier of a compliance software application (e.g., a compliance bot username). The compliance software application may comprise data retention software that stores messages in accordance with a data retention policy. In response to providing the cryptographic key, the system may cause the second user to validate the cryptographically signed attestation. As a result of the second user validating the cryptographically signed attestation, the system may cause the second user to include the compliance software application as a recipient of one or more messages being sent to the first user.

In another example, once accepting a compliance configuration a client device of a user may publish a cryptographically signed attestation to a server that contains information about their compliance configuration. In at least one embodiment, the cryptographically signed attestation becomes part of a profile of the client device of the user. In another example, changes to a user's environmental information, such as changes to a network identifier, user group, a user identifier, a user signing key, or a compliance bot, will invalidate the attestation. In another example, once a client device of a user or security group changes to a different compliance configuration or signing key, a prior attestation may automatically be invalidated.

In another example, in response to a request to a server for a list of keys, the server may respond with keys for each user requested, along with any additional responses that may be required to cover compliance configuration. In at least one embodiment, the server consolidates the information to avoid duplication. In at least one embodiment, the server provides client devices with an original attestation of at least one user that triggered a specific compliance agent/bot to be added to communication. In another example, once a compliance bot is made active, any message a client within that network sends has to include the compliance bot in that message. If the compliance bot is not included in the message, that message will fail to send. In yet another example, after receiving a list of keys from the server, the client user may verify that any responses not originally requested have valid attestations associated with them that bind that additional key to a specific user in the communication (e.g., "I'm also sending this message to compliance bot because user ann@company.com provided an attestation proving user requires it").

In some embodiments, techniques for two-way compliance include a two-step process comprising an administrator turning on compliance, and client devices uploading signed attestations. In one example, after a user uploads an attestation from any of one or more devices of the user, key requests for that user may start returning the compliance bot as an extra key with an extra property for the attestation, which the sender may then validate with their signing key.

As one skilled in the art will appreciate in light of this disclosure, certain embodiments may be capable of achieving certain advantages, including some or all of the following: improving the field of computing, specifically in the field of compliance with regulatory requirements of group chats, especially when data being transferred from outside a network is of high importance to the host organization, and providing a simplified user interface. Moreover, techniques described and suggested in the present disclosure are necessarily rooted in computer technology in order to overcome difficulty of storing copies of both sides of a conversation, specifically arising with communication using end-to-end encryption. For example, techniques described herein provide tools for companies to practice two-way compliance of regulatory and auditory requirements, and tools for maintaining security of communication in transit between organizational networks in a cryptographically verifiable manner.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
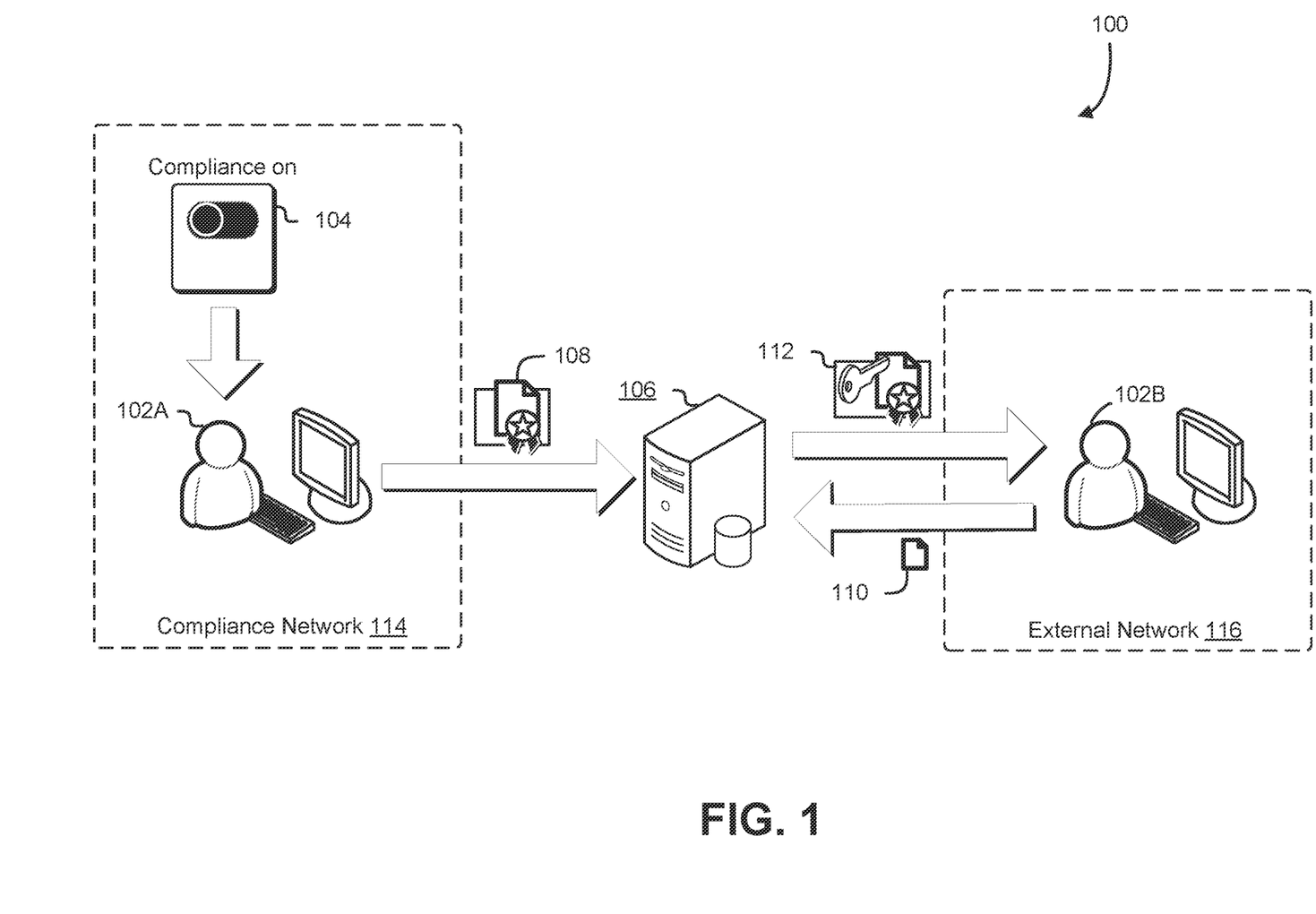
FIG. 1 illustrates an overview of a two-way compliance service in accordance with an embodiment.

FIG. 1 illustrates an aspect of an environment 100 and a depiction of development process in which an embodiment may be practiced. As illustrated in FIG. 1, the environment 100 may include client devices of users 102A-B, an indicator of "compliance on" 104 (by an administrator console not illustrated in FIG. 1), a back-end server 106 of a computing resources service provider, an attestation 108, a request for endpoints 110 associated with user signing keys of users, and client user and compliance bot keys 112. Although the communications are illustrated to be directed to and from a person, it is understood that they are directed to and from a device under the control of a person. In one embodiment, the environment 100 includes a client user, such as user 102A, in a compliance network 114 and a client user, such as user 102B, in an external network 116. In at least one embodiment, the administrator console turns on compliance 104, and the client device of user 102A uploads a cryptographically signed attestation 108, accepting a compliance configuration.

The user(s) 102A-B may be one or more of individuals, computing systems, applications, services, resources, or other entities having been authorized to administrate a compliance service. The users 102A-B may have a unique name (e.g., username) within an account with a computing resource service provider and may present, or otherwise prove, the possession of security credentials, such as by inputting a password, access key, and/or digital signature, to gain access to computing resources of the account. The user(s) 102A-B may be a customer of the computing resource service provider. The user may publish, using a computing device, a cryptographically signed attestation, using an application programming interface, to a server that contains information about a compliance configuration. Further detail on this may be found in the description of FIGS. 2 and 3 below.

The client device(s) of user(s) 102A-B, in some embodiments, is embodied as a physical device and may be able to send and/or receive requests, messages, or information over an appropriate network. Examples of such devices include personal computers, cellular telephones, handheld messaging devices, laptop computers, tablet computing devices, set-top boxes, personal data assistants, embedded computer systems, electronic book readers, and the like, such as the system 800 described in conjunction with FIG. 8. Components used for such a device can depend at least in part upon the type of network and/or environment in which the embodiment is implemented. Protocols and components for communicating via such a network are well known and will not be discussed in detail. Communication over such a network may be enabled by wired or wireless connections and combinations thereof.

The administrator console (not illustrated in FIG. 1) turns on compliance 104. In one example, the administrator console may communicate with a back-end server 106 to indicate that a messaging component of the computing system service provider is being monitored by a compliance bot. In another example, the administrator console may provide a user interface (such as a graphical use interface) that alerts customers of compliance policies and allows users to create/start a compliance service and pause/stop the compliance service. In at least one embodiment, an application in a non-compliance network shows an indication (e.g., via a user interface) that messages being sent to a client, in the compliance network, are being recorded before letting messages be sent to the client. In at least one embodiment, once a client first discovers that another client has a compliance bot, the system provides a disruptive warning (e.g., all messages sent to ann@example.com will be recorded to a example.com owned compliance bot). Once the client has sent a message to that other client, the system may provide a non-disruptive icon or other indicator.

Once the administrator turns compliance on 104, a compliance configuration or configuration file may be provided to all the client devices within a network (e.g., this is the compliance bot name, the key associated with it, and the public key associated with it). In one example, as a result of the administrator console enabling two-way compliance, clients receive a signal (e.g., "your organization has turned on compliance") to pull the latest configuration, such as configuration file, as illustrated in FIG. 1.

The attestation 108 may be cryptographically signed using a private key of public-private key pair and provided to the back-end server 106. The attestation 108 contains information about the compliance configuration. A client device of a user, such as user 102A, may upload the attestation 108 once the user 102A is notified that compliance is on. A user may upload the attestation from any on the user's devices. Once the attestation is uploaded, key requests for that user may start returning a compliance bot as an extra key with an extra property for the attestation. In one example, if a client or security group changes to a different compliance configuration or user signing key, a prior attestation may automatically become invalidated. The network identifier or username hash of the user that created the attestation may not match with information returned in a user status request. The client may have changed compliance configuration by moving to a different network, and if the server failed to clear the user's prior attestation, a sender may send a message to an erroneous compliance bot. In another example, an attestation may bind to a network identifier of a network that the user is in, and if the network identifier changes because the user moved to a different account, users may not send to that compliance agent because the attestation is no longer valid.

The client user and compliance bot keys 112 provided in response to the request 110 may include a user signing key that may be used to encrypt a data object (e.g., messages or files) between clients of a computing resource service provider network. The user signing key may be a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the message is digitally signed using a private key of a public/private key pair corresponding to a client device of a user that encrypts and/or digitally signs the data object.

Figure 2:
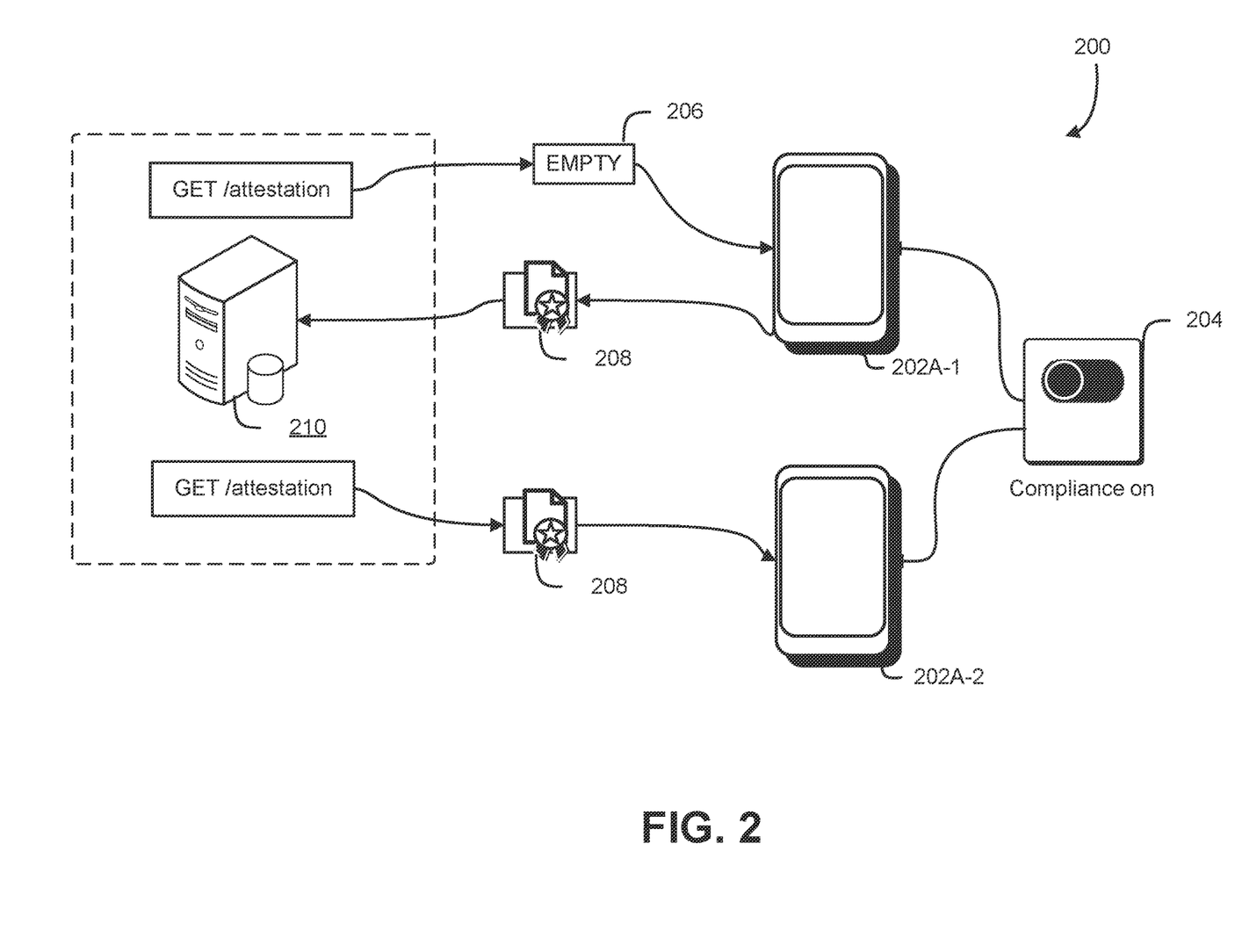
FIG. 2 illustrates an example of turning on compliance in accordance with a compliance bot in accordance with an embodiment.

FIG. 2 illustrates an aspect of an environment 200 in which an embodiment may be practiced. As illustrated in FIG. 2, the environment 200 may include a first device of a user 202A-1, a second device of the user 202A-2, and an indicator of "compliance on" 204 (by an administrator console not illustrated in FIG. 2), an attestation 208, and a server 210. The first and second device of a user 202A-1 and 202A-2 may be similar to the client device(s) of user(s) 102A-B of FIG. 1. The indicator of "compliance on" 204 may be similar to the indicator of "compliance on" 104 of FIG. 1. The attestation 208 may be similar to the attestation 108 of FIG. 1.

When the administrator console turns compliance on 204, a signal may be transmitted to all devices on that network notifying the devices of a new compliance requirement. If a client is online, it may receive the signal immediately. Otherwise, devices that are not online may receive the signal the next time a device logs into the system. In one example, when the first device of the user 202A-1 receives the signal of compliance on 204, the first device may request its own attestation (e.g., GET/attestation). If the "GET" query for the attestation returns empty 206, e.g., the device does not find an attestation assigned to it, the first device 202A-1 may create and upload an attestation 208. This is to ensure that only one of a user's devices uploads the attestation. For example, if a second device of the user 202A-2 requests an attestation (e.g., GET/attestation), the server 210 may return the signed attestation 208 that was uploaded by the first device of the user 202A-1. In one embodiment, once a device creates an attestation, the device certifies to other devices that the device being added to the communication network accepts the compliance configuration. The other devices may then use a user signing key of the device to create a signed data packet with information the sender needs to trust the compliance bot.

Figure 3:
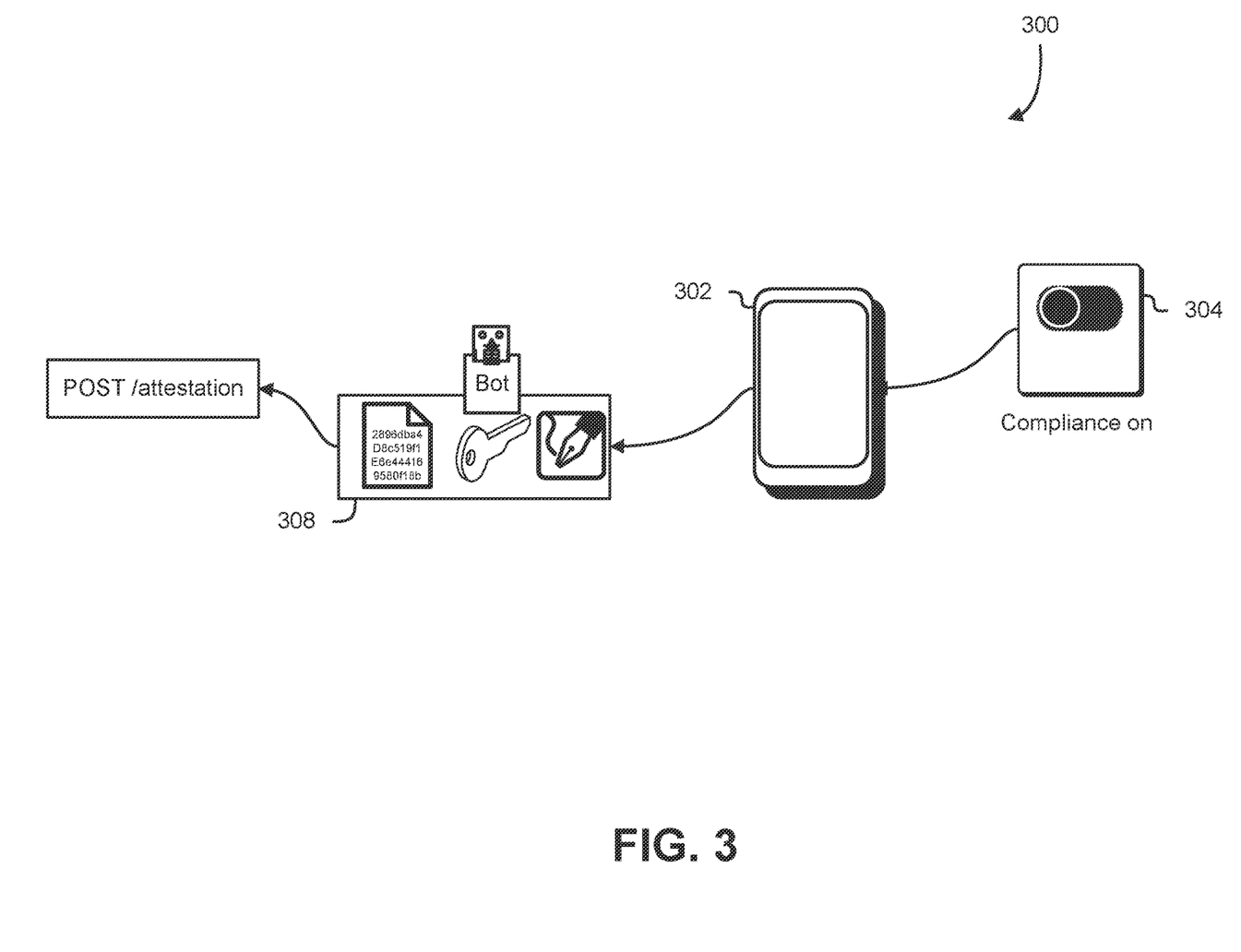
FIG. 3 illustrates an example of illustrates an example of creating and signing attestation in accordance with an embodiment.

FIG. 3 illustrates an aspect of a system 300 of an embodiment of the present disclosure. FIG. 3 depicts a representation of creating and signing an attestation by a client device of a user 302 in accordance with a compliance configuration. As illustrated in FIG. 3, the environment 300 may include the client device of the user 302, and an indicator of "compliance on" 304 (by an administrator console not illustrated in FIG. 3), and an attestation 308. The client device of the user 302 may be similar to the client device(s) of user(s) 102A-B of FIG. 1. The indicator of "compliance on" 304 may be similar to the indicator of "compliance on" 104 of FIG. 1. The attestation 308 may be similar to the attestation 108 of FIG. 1. Although the communications are illustrated to be directed to and from a person, it is understood that they are directed to and from a device under the control of a person.

In one example, when the client device of the user 302 creates an attestation 308, the user may ensure that other clients in the compliance network may communicate with both the user 302 and a compliance bot as legitimate client users. The other clients may then use the user signing key to create a signed data packet with information a sender needs to trust the compliance bot. In some examples, a JSON Web Token (JWT) is be used to store data and the signature associated with the client user and compliance configuration. The data stored in the attestation 308 may include a user identifier (ID), date issued, a network ID, a compliance username hash, and a public cryptographic key of the compliance bot. The compliance username hash may be the username of the compliance bot. The data is wrapped in the attestation 308, which is then signed with a private key, of a public-private key pair, of the user 302. The attestation 308 may be bound to the network ID, so if the server switches to a different network the attestation becomes invalid. Similarly, the attestation may be bound to any of the above elements that are used to generate the attestation 308. For example, if a user or group changes to a different compliance configuration or user signing key, the previous attestation may automatically become invalidated. In one embodiment, a signed attestation is not modifiable by a server. For example, if any of these parts of information in the attestation were changed then the entire attestation becomes invalid because the digital signature does not match with the information in the attestation (such as user key or network identifier), which is important for potential security events and encryption.

In one example, a cryptographic attestation may be signed using an elliptic curve digital signature algorithm (ECDSA). The ECDSA is a variant of digital signature algorithm (DSA). Using the ECDSA, a digital signature is generated from a hash of the attestation provided by the client device of the user and a private key of a public-private key pair. In one example, a user signing key may be a private key. With the public key, and algorithm can be applied to the signature to determine if the signature was produced from the hash and the private key of the public-private key pair. The public key may ensure that the client device of the user has access to the private key of the public private key pair included in the signed attestation. In one embodiment, the ECDSA uses asymmetric cryptography. In one example, the public key may be used for encrypting content of messages sent between client devices of users. In one example, the private key may be used for signing the attestation of client device of the user.

Figure 4:
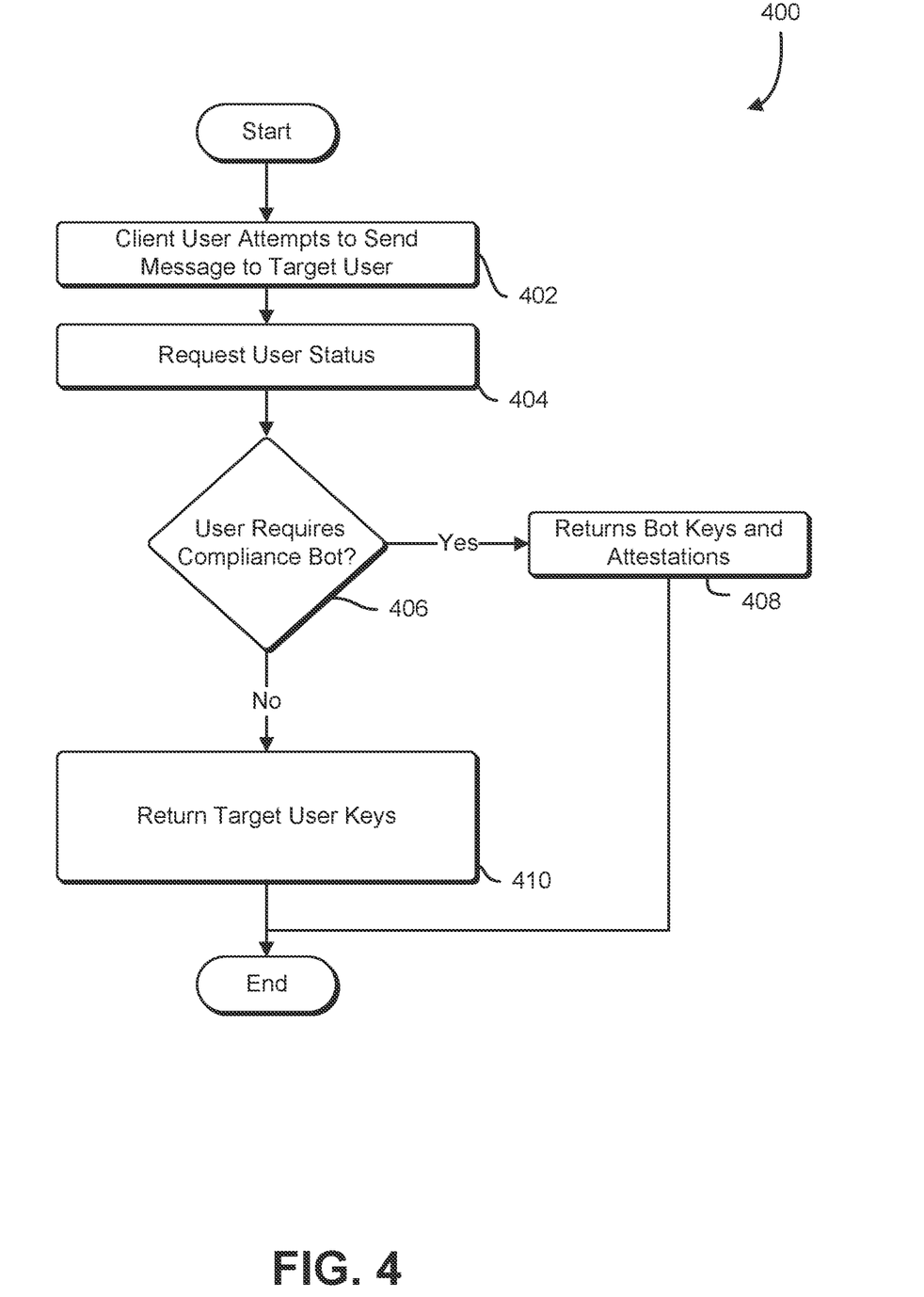
FIG. 4 is a flowchart that illustrates an example of discovering a compliance bot of a recipient in accordance with an embodiment.

FIG. 4 is a flowchart illustrating an example of a process 400 for discovering a recipient of a message has a compliance bot turned on. Aspects of process 400 may be used for implementations in a user interface of a client. Some or all of the process 400 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 400 may be performed by any suitable system, such as the computing device 900 of FIG. 9. The process 400 includes at least three ways for client users to discover that someone they are communicating with has a compliance bot turned on. A compliance bot (also called an internet bot or agent) can be defined by, but is not limited to, a software application in a network that is programmed to perform automated tasks (e.g., execute commands, respond to messages, perform routines, etc.) and/or interact with systems or users. The compliance bot may imitate a human behavior, such as "listening" to a conversation between users and perform a repetitive task that a human would otherwise perform, such transcribing an audio file and storing the transcription. It is contemplated that the process 400 may be performed by a server of a compliance service, such as the server 210 of FIG. 2.

In 402, a client device of a user attempts to send a message to a client device of a target user. In 404, the client device of the user solicits a user status request of a client device of the target user. In some examples, a user status request may return an indication that a client device of a target user requires a compliance bot. In 406, if the target user requires a compliance bot, then the system performing the process 400 may proceed to 408, whereupon the system, in response to a keys request from the client device of the user, returns keys for the compliance bot and the attestation for the target user. In at least one embodiment, in response to the user status request, a Boolean indication is provided that the client device of the target user has a compliance bot, which prompts client users to show an indication of agreement that messages between the client users and the target user will be recorded. In at least one embodiment, the client device of the user will verify the attestation after it is received in response to the keys request.

Otherwise, if the target user does not require a compliance bot, then the system performing the process 400 may proceed to 410, whereupon the system returns the keys of the target user. In this case, the client device of the target user may not provide an attestation with the respective endpoint. In one example, prior to a client device of a target user uploading an attestation to a compliance service, messages being sent to the client device of the target user may not be recorded. Before a client user uploads an attestation, the client user is in a pending state. While a client user are in a pending state, incoming messages may not be recorded until the client user publishes a cryptographically signed attestation to a server that contains information about the client user compliance configuration.

In one embodiment, non-key identity requests (e.g., getUserInfo w/lookup=1) have a target user's attestation alongside user identifier data. In this case, a client device of a user can verify the attestation data using the signature of the attestation, before sending a message to the target user.

In the two cases of user status requests and non-key identity requests, the client device of the user may have discovered the compliance bot before sending a message and can take steps to inform the user that their messages will be recorded. In both cases, the user may not verify the attestation until the user attempts to send a message and is provided the compliance bot keys. If, in one example, the user sends a message to an existing contact before the user obtains the user status or identity information of the existing contact, the user may discover that it is required to send to a compliance bot when requesting keys, for the first time. In this case, the user may be prompted to confirm that it agrees with being recorded. If the user rejects the request to be recorded, then the keys may be lost and the message send aborted. Note that one or more of the operations performed in 402-10 may be performed in various orders and combinations, including in parallel.

Figure 5:
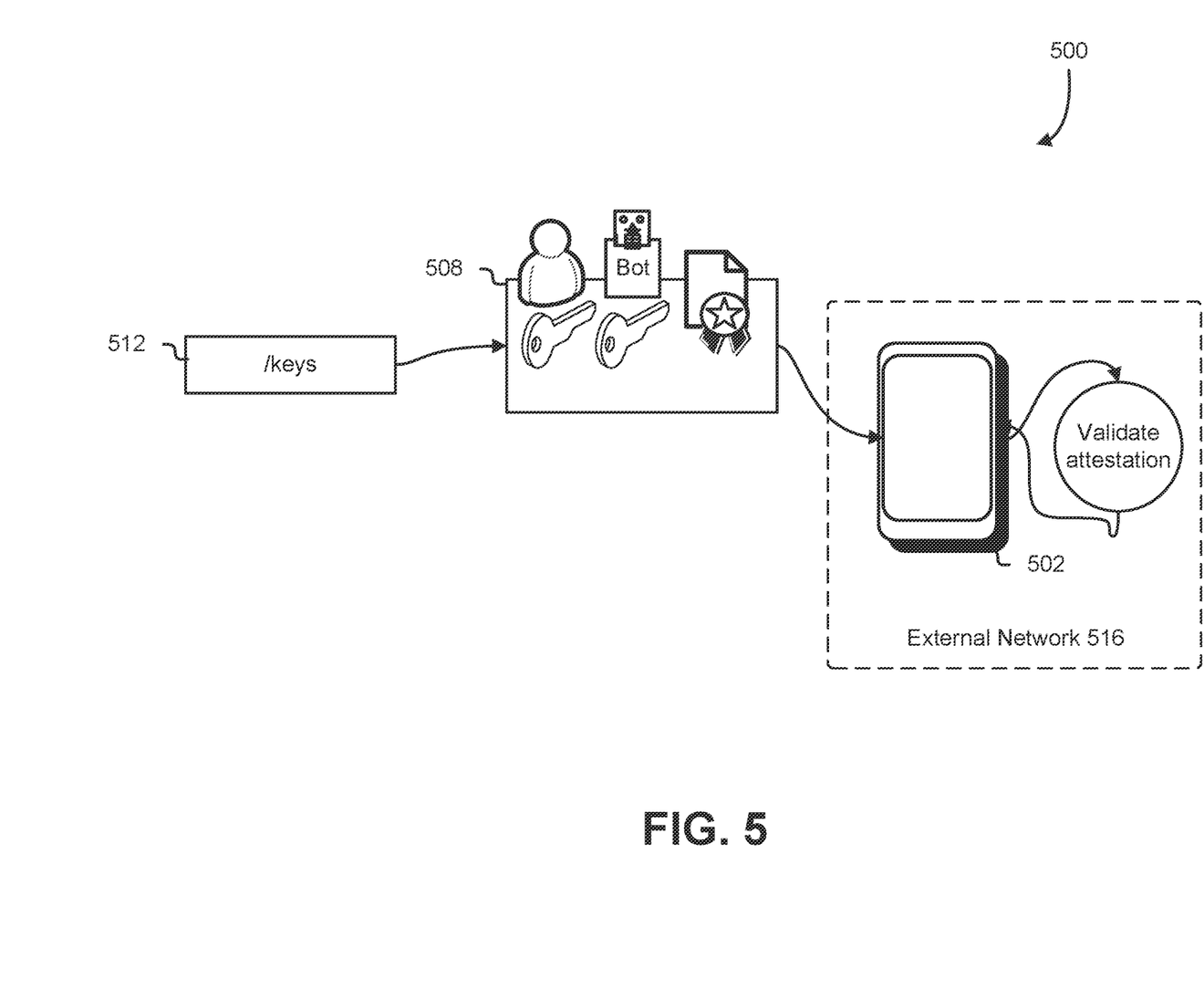
FIG. 5 illustrates an example of illustrates an example of validating an attestation in accordance with an embodiment.

FIG. 5 illustrates an aspect of a system 500 of an embodiment of the present disclosure. FIG. 5 depicts a representation of validating a cryptographically attestation by a client device of a user 502, in an external network 516 outside of a compliance network. As illustrated in FIG. 5, the system 500 may include the client device of the user 502 and an attestation 508. The client device of the user 502 may be similar to the client device of user 102B of FIG. 1. The attestation 508 may be similar to the attestation 108 of FIG. 1. Although the communications are illustrated to be directed to and from a person, it is understood that they are directed to and from a device under the control of a person.

In one embodiment, when the client device of the user 502 receives the attestation 508 in response to a keys request 512 to a server, before the user 502 includes the compliance bot to the recipients of a message, the user 502 will validate the signature. In one example, the user 502 can validate the attestation 508 using a standard library for securely transmitting data between parties, such as JSON Web Token (JWT) library, and the public user key returned by the server for the user attesting the compliance bot, similar to the client device of user 102A in FIG. 1.

The attestation 508 may include the username hash of the user that uploaded the attestation 508. In one example, the user 502 may use the user signing key that it stored locally for the target user or request the user signing key again from the server, to validate the attestation 508. In at least one embodiment, in addition to verifying the signature of the attestation 508, the user 502 verifies that a network ID in the JWT token matches a network ID obtained from the user status request, such as in 404 of FIG. 4. For example, if the server failed to clear the attestation of a user that has moved to a different network, then the techniques described herein may prevent against a message being sent to an erroneous compliance bot.

In one embodiment, a system consolidates attestations of client devices. To reduce the size of a key request payload, compliance bot elements may contain one attestation of a client user in a compliance network that a sender requests. For example, if the sender requested keys for 100 users in the same compliance network, the system may choose the attestation for the first user in the list and add it to the keys for the compliance bot. The system may consolidate the attestations, as described herein, at least because it does not matter whether 100 recipients in the list require compliance or whether only 1 recipient requires compliance. Either way, the system sends the message to the compliance bot. Only one user may be needed to attest to the validity of the compliance bot. In another example, in rooms with multiple users in the same network, only one user may need to have uploaded their attestation in order for messages to be recorded.

In at least one embodiment, however, an attestation for one user in a network is not to be assumed as applying to other users in that network. In one example, if a room of 100 company.com users include users A and B, and an attestation for user A is provided in a key request to a client device of another user (e.g., "sender"). When the sender subsequently transmits a message to user B, the sender must still validate the attestation of user B separately.

In some embodiments, particular events cause the attestation 508 to be cleared from a server (e.g., removed from memory, erased, deleted from a data store, etc.) for a user. The particular events may include the following: when the user forgets their password/reset their account, when an administrator console in an enterprise environment resets a user account, and when the user moves between networks via the administrator console. Each of the above will change the attestation data or signing key and will require the user, such as user 102A in FIG. 1 to upload a new attestation. The above may result in a non-compliance gap between the time one of the above happens and when the user logs in again. In at least one embodiment, a client device of a user does not clear its own attestation. The server may clear an attestation on behalf of a user or as a result of an administrator action.

Figure 6:
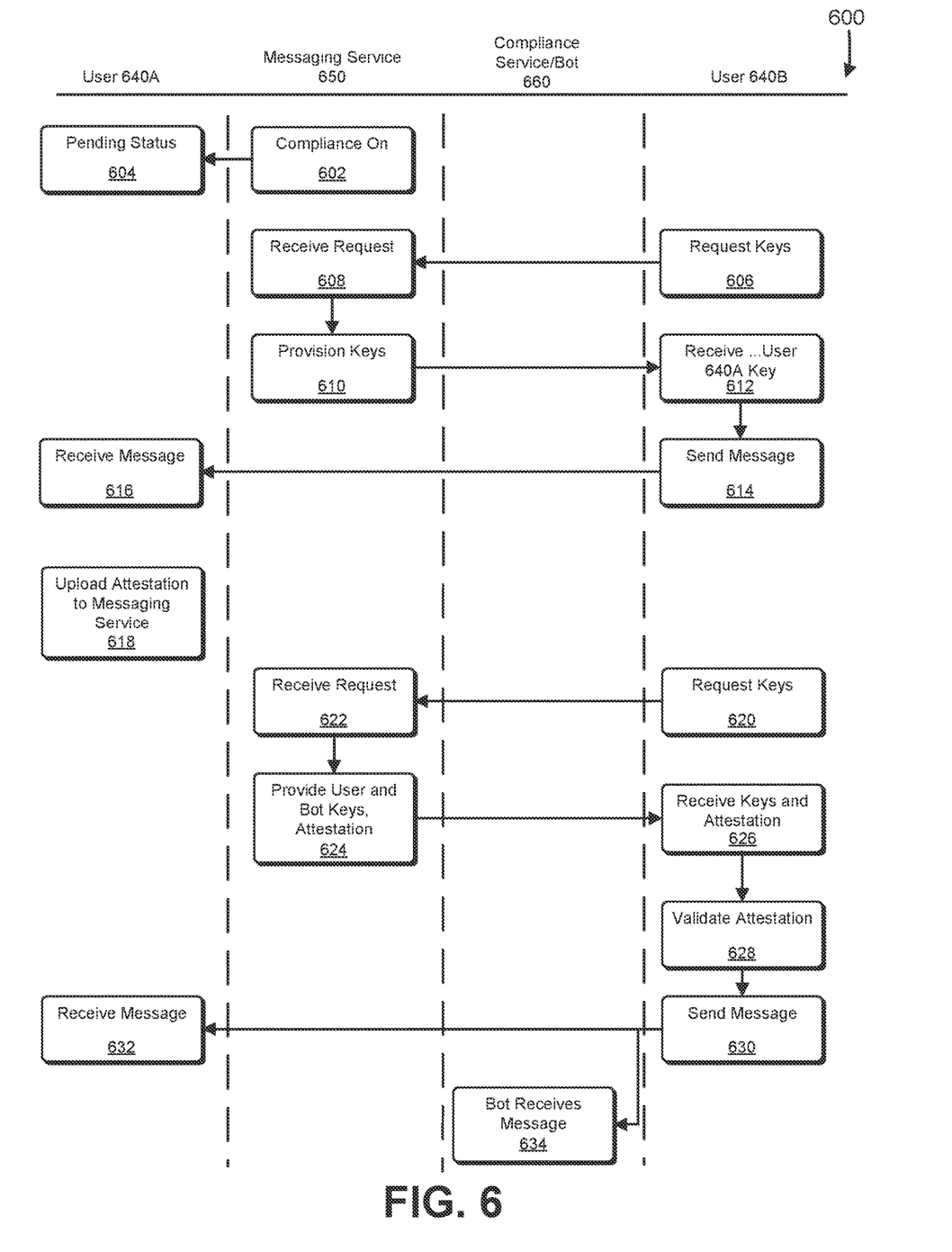
FIG. 6 is a swim diagram that illustrates an example of sending messages to pending users in accordance with an embodiment.

FIG. 6 is a swim diagram illustrating an example of a process 600 for sending messages to pending users in accordance with various embodiments. Some or all of the process 600 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, such as a system 800 of FIG. 8. The process 600 includes a series of operations wherein administrator console starts a messaging service 650, a compliance service/bot 660 and a client device of a user 640A receives messages client device of the other user 640B before and after user 640A uploads and attestation 108, as illustrated in FIG. 1.

In 602, administrator console of a compliance service turns compliance on, similar to the indication on of "compliance on" 104 of FIG. 1. In 604, user 640A is in a pending state, at least because the client may not have uploaded its attestation. If the user 640A has not yet been notified of the compliance configuration, for example, if the user 640A is off-line, it will receive notification of the compliance configuration the next time the user 640A logs in to the system. In one example, an administrator of the network may be able to identify clients that are in a pending state, and messages being sent to pending client may be received but not recorded.

In 606, a second user 640B, in a network external to the compliance network, requests endpoints associated with user signing keys of users, such as 640A, in the compliance network. In 608, a backend server of the compliance service receives the request for endpoints/keys. In one embodiment, to enable client-side encryption, a resource name value associated with a master key of a key management system (KMS) is defined. The compliance service may have access to the KMS to configure the compliance bot, such as with credentials and/or additional information about a compliance account and use for encrypting (and decrypting) the compliance bot with keys from a storage service.

In 610, a backend server provides a list of user signing keys, including a user signing key for user 640A, to the second user 640B. In 612, the second user 640B receives the list of user signing keys including the user signing key for user 640A. In 614, the second user 640B proceeds to send a message to recipients including user 640A using respective user signing keys of the recipients. In 616, the user 640A receives the message sent from the second user 640B, of the network outside of the compliance network. In at least one embodiment, the user 640A receives the message, even with a compliance bot not being included as a recipient.

In 618, the user 640A proceeds to upload a cryptographically signed attestation to the compliance configuration 618. In 620, the second user 640B sends a subsequent request for endpoints associated with user signing keys of users, such as 640A, in the compliance network. In 622, the backend server of the compliance service receives a subsequent request for endpoints/keys. In 624, the backend server provides a list of user signing keys, including a user signing key for user 640A and signing key for a compliance bot, to the second user 640B. The server provides the signing key of the compliance bot at least because user 640A uploaded its attestation. In 626, the second user 640B receives the list of user signing keys including the user signing key for user 640A and the compliance bot. In 628, user 640B validates the attestation, as described in FIG. 5. In 630, the second user 640B proceeds to send a message simultaneously to recipients including user 640A and the compliance service/bot 660. Accordingly, in 632, user 640A receives the message and, in 634, the compliance bot receives the message.

Figure 7:
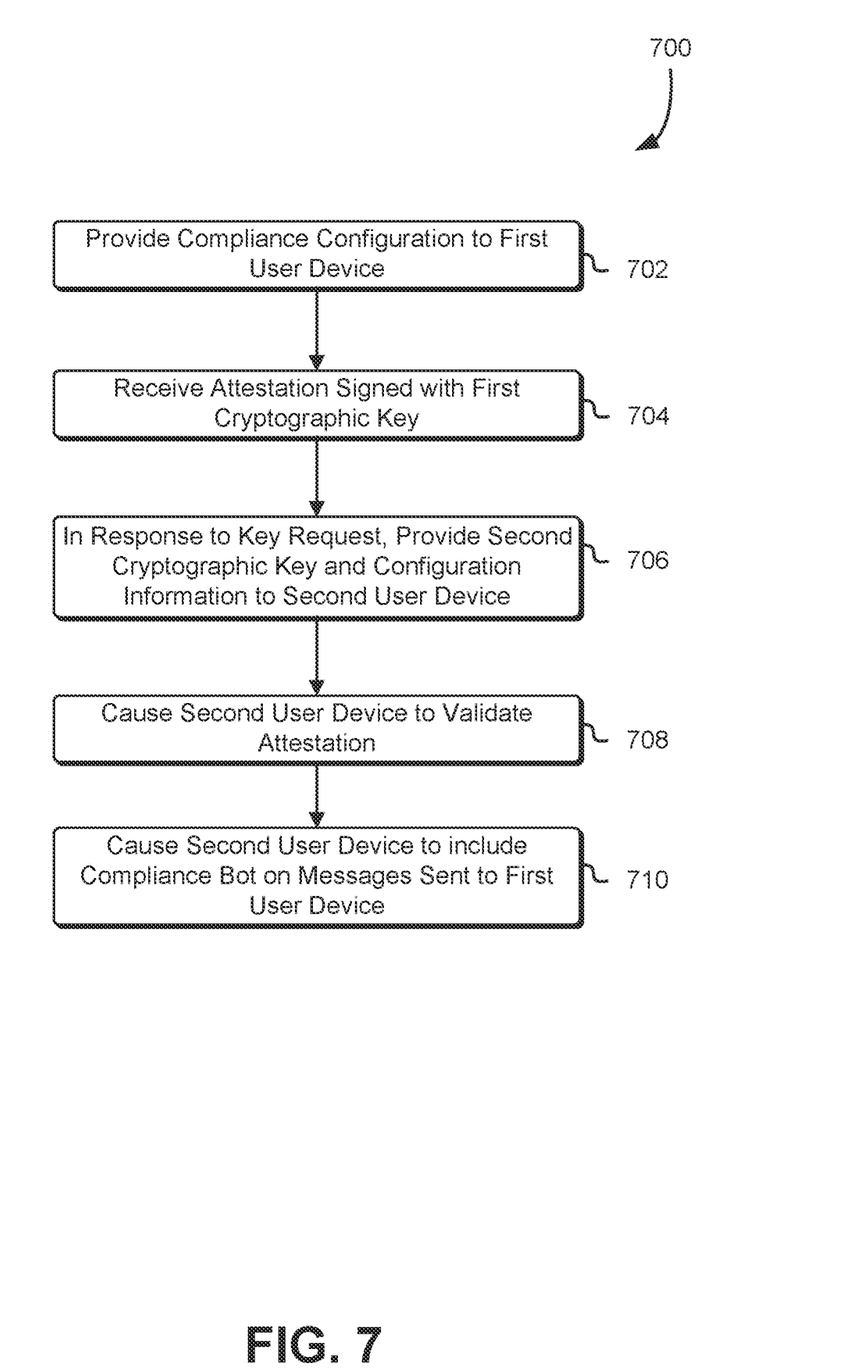
FIG. 7 is a flowchart that illustrates an example of activating a two-way compliance service in accordance with an embodiment.

FIG. 7 is a flowchart illustrating an example of a process 700 for in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 8:
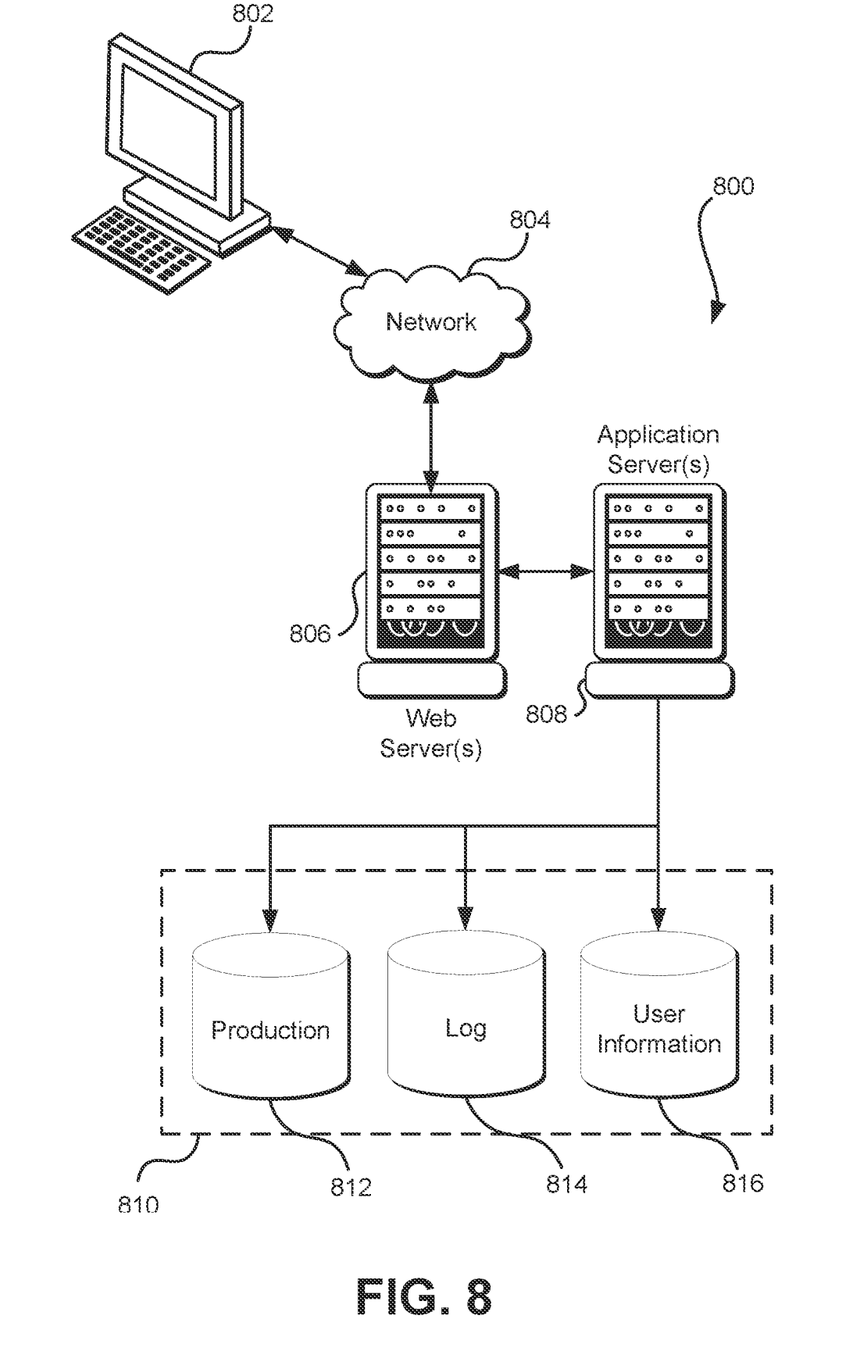
FIG. 8 illustrates a system in which various embodiments can be implemented.

For example, some or all of process 700 may be performed by any suitable system, such as a server in a data center, by various components of the system 800 described in conjunction with FIG. 8, such as the web server 806 or the application server 808, by multiple computing devices in a distributed system of a computing resource service provider, or by any electronic client device such as the electronic client device 802. The process 700 includes a series of operations wherein a system provides a compliance configuration to a first user, receives an attestation signed with cryptographic key, provides a list of cryptographic keys to a second user, cause the second user device to validate the attestation, and cause the second user to include a compliance bot on messages sent to the first user. It is contemplated that the process 700 may be performed by a compliance service, such as the compliance service of FIG. 1.

In 702, the system performing the process 700 may provide a compliance configuration to a client device of a user of an organizational network (e.g., how records and data should be formatted, how long the data is kept, what storage system should be used, etc.), the compliance configuration is provided to notify clients within the network that compliance has been activated. In at least one embodiment, if a client is online, the client will receive the notification of the compliance configuration immediately. Otherwise, the client will receive the notification of the compliance configuration the next time the client device logs in. A new client device of a user may be started in a pending state until a compliance bot client or other existing client provisions the new client device.

In 704, as a result of the client accepting the compliance configuration and publishing an attestation, the system receives the attestation at a backend server. In at least one embodiment, the attestation contains information about the compliance configuration, and becomes part of the client user profile. In at least one embodiment, the attestation is uploaded and binds a signature from the user account key to the compliance configuration that is uploaded to the server and stored. In 706, in response to a request for client user signing keys (associated with user endpoints), from a second client, the system provides a list of cryptographic keys including the client user signing key of the first client and additional configuration information. In at least one embodiment, the additional configuration includes the compliance bot key and the attestation.

In 708, the system causes the second client device of a user to validate the attestation after the second client receives the attestation with client user keys and the compliance bot key, in response to the keys request. In at least one embodiment, before a client ("sender") adds the compliance bot to the list of recipients of a message, the client must validate the signature. In one example, a client may validate the signature using a JSON Web Token (JWT) library and the public user key returned by the backend server for the client attesting to the compliance bot. In at least one embodiment, in addition to, the client must verify that the network ID in the JWT matches the network ID that is returned from a user status request. If, for example, a client moves to a different network and the backend server fails to clear the client user attestation the techniques, presented herein, will prevent a client (e.g., "sender") from sending a message to an erroneous compliance bot.

In 710, the system causes the second client of a user to send a message to the first client and include the compliance bot as a recipient of the message. (e.g., "User Bill is also sending this message to compliance bot because user ann@company.com provided an attestation proving user requires it"). In one example, if a network has compliance enabled, and at least one of the client recipients has uploaded their attestation, then the server may reject messages that do not include the required compliance bot(s). In another example, if a client receives an attestation, but then fails the signature check, the client may reject the message send and alert the client that the server may have provided an invalid compliance bot.

Note that one or more of the operations performed in 702-10 may be performed in various orders and combinations, including in parallel.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A non-transitory computer-readable storage medium storing thereon executable instructions that, as a result of being executed by one or more processors of a computer system, cause the computer system to at least:
provide a compliance configuration to a first device;
obtain, from the first device, an attestation signed with a cryptographic key, the attestation comprising information associated with the compliance configuration;
obtain, from a second device, a request for a list of endpoints;
in response to the request, provide an additional cryptographic key associated with the first device and additional information in accordance with the compliance configuration, the additional information comprising the attestation and an identifier of a compliance software application;
cause, in response to the additional cryptographic key and the additional information being provided, the second device to:
validate the attestation; and
provide a message to the first device and the compliance software application as recipients.

2. The non-transitory computer-readable storage medium of claim 1, wherein the executable instructions further comprise instructions that, as a result of being executed by the one or more processors, cause the computer system, to:
determine that the attestation is no longer valid; and
as a result of the attestation being invalid, prevent other devices from sending messages to the first device.

3. The non-transitory computer-readable storage medium of claim 1, wherein the executable instructions further comprise instructions that, as a result of being executed by the one or more processors, cause the computer system to, in response to the request for a list of cryptographic keys, provide a consolidated attestation that reduces a payload associated with the request based at least in part on selecting a first attestation that is uploaded by the first device.

4. The non-transitory computer-readable storage medium of claim 1, wherein the executable instructions further comprise instructions that, as a result of being executed by the one or more processors, cause the computer system, to cause, as a result of a user account being reset, cause another device in a group that includes a client device of the user account to reenable the client device corresponding to the user account to receive messages in accordance with the compliance configuration.

5. The non-transitory computer-readable storage medium of claim 1, wherein the executable instructions further comprise instructions that, as a result of being executed by the one or more processors, cause the computer system to determine whether to record the message based at least in part on a policy of the compliance configuration.

6. The non-transitory computer-readable storage medium of claim 1, wherein the validating of the attestation is based at least in part on a key that is stored in a local environment of the second device.

7. The non-transitory computer-readable storage medium of claim 1, wherein validation of the attestation is performed at least in part by verifying that environmental information associated with a user of the first device included in the attestation matches environmental information provided as a result of a user status request of the user of the first device.

8. The non-transitory computer-readable storage medium of claim 1, wherein the attestation is cryptographically signed using a digital signature algorithm.

9. A computer-implemented method, comprising:
providing a compliance configuration of a compliance service to a first client device of a first user;
receiving, from the first user, a cryptographically signed attestation that was signed using a first cryptographic key, the cryptographically signed attestation:
comprising information associated with the compliance configuration; and
indicating acceptance of the compliance configuration by the first user;
in response to a request, from a second client device of a second user, for a list of endpoint destinations associated with a set of users, providing a second cryptographic key associated with the first client device and additional information in accordance with the compliance configuration to the second user, the additional information comprising the cryptographically signed attestation and an identifier of a compliance software application; and
causing, as a result of providing the second cryptographic key and the additional information, the second client device to validate the cryptographically signed attestation, wherein validation of the cryptographically signed attestation by the second client device causes the second client device to provide, to the compliance software application, a copy of a message provided by the second client device to the first client device.

10. The computer-implemented method of claim 9, further comprising:
determining, based at least in part on a change to environmental information of the first user, that the cryptographically signed attestation does not correspond to the change to the environmental information;
clearing the cryptographically signed attestation from a server of the compliance service; and
as a result of the clearing the cryptographically signed attestation, causing the first client device to provide a new cryptographically signed attestation, the new cryptographically signed attestation comprising information associated with the change to the environmental information.

11. The computer-implemented method of claim 1, further comprising, causing, as a result of providing an additional key with the second cryptographic key and the additional information, the first client device to verify that the additional key, that was not originally requested in the request for the list of endpoint destinations has a valid cryptographic attestation that corresponds to at least one client device of the compliance service.

12. The computer-implemented method of claim 1, wherein an endpoint destination of the list of endpoint destinations corresponds to a key and username associated with the first client device.

13. A system, comprising:
one or more processors; and
memory that stores computer-executable instructions that, if executed, cause the one or more processors to:
provide an indication that a compliance service is activated, the indication including a compliance configuration;
cause, as a result of the indication that the compliance service is activated, a first user device to upload an attestation to a server of a computing resource service provider, the attestation binding a signature from a first key to the compliance configuration;
in response to a request for a plurality of keys associated with endpoints of a user network, from a second user device, provide a second key associated with the first user device, a third key associated with a compliance agent, and the attestation, wherein the second key is usable to encrypt a message being sent to the first user device and the third key is usable to encrypt a message being sent to the compliance agent; and
cause, as a result of providing the second key, the third key, and the attestation, the second user device to validate the attestation, wherein the validation of the attestation by the second user device, cause the second user device to send to the compliance agent a copy of a message to the first user device.

14. The system of claim 13, wherein the attestation is a cryptographically signed attestation that comprises one or more of:
an identifier of the compliance agent,
an identifier associated with the first user device, or
an identifier of a network associated with the first user device.

15. The system of claim 13, wherein, memory that stores computer-executable instructions that, if executed, further cause the one or more processors to cause, as a result of providing the second key, the third key, and the attestation, the first user device to verify that an additional key, provided in response to the request for the plurality of keys has a valid attestation that corresponds to a specific client user.

16. The system of claim 13, wherein a profile of the first user device indicates that the attestation includes more than one key that is associated with the first user device.

17. The system of claim 13, wherein prior to receiving the attestation from the first user device, messages received from the first user device are unable to be recorded in accordance with the compliance configuration.

18. The system of claim 13, wherein the attestation is cryptographically signed using an elliptic curve digital signature algorithm.

19. The system of claim 13, wherein the second key is a public key of an asymmetrical key pair.

20. The system of claim 13, wherein a notification, obtained via an interface of the second user device, indicates that the first user device requires the compliance agent be included in messages.

* * * * *